United States Patent [19]

Eichman et al.

[11] Patent Number: 5,990,228
[45] Date of Patent: Nov. 23, 1999

[54] COATING COMPOSITIONS

[76] Inventors: Henry Jude Eichman, 45 Fairfield Rd., Havertown, Pa. 19083; Aurelia de la Cuesta Sheppard, 1299 Fountain Rd., Newtown, Pa. 18940; Timothy Grant Wood, Rua Beatriz Sa de Toledo, 95 Apto. 501, Vila Ema, Sao Jose dos Campos-SP, Brazil, 12243-050

[21] Appl. No.: 09/010,634

[22] Filed: Jan. 22, 1998

[51] Int. Cl.⁶ .................................................. C08L 51/00
[52] U.S. Cl. ............................................................ 524/529
[58] Field of Search ............................................. 524/529

[56] References Cited

U.S. PATENT DOCUMENTS

| | | | |
|---|---|---|---|
| 4,501,845 | 2/1985 | Baus et al. . | |
| 4,812,516 | 3/1989 | Maeda | 525/85 |
| 4,968,740 | 11/1990 | Makati et al. . | |
| 5,064,717 | 11/1991 | Suzuki | 428/352 |
| 5,100,963 | 3/1992 | Lin | 525/221 |
| 5,166,242 | 11/1992 | Chu | 524/238 |
| 5,232,987 | 8/1993 | Sakakibara | 524/483 |
| 5,236,991 | 8/1993 | Makati et al. . | |
| 5,360,826 | 11/1994 | Egolf | 521/54 |
| 5,480,920 | 1/1996 | Sharma | 523/161 |
| 5,610,215 | 3/1997 | Nonweiler | 524/444 |

FOREIGN PATENT DOCUMENTS

| | | |
|---|---|---|
| 0656909 | 7/1996 | European Pat. Off. . |
| 63-018632 | 4/1988 | Japan . |

*Primary Examiner*—Paul R. Michl
*Attorney, Agent, or Firm*—Kevin F. Gironda

[57] ABSTRACT

Aqueous coating compositions containing at least 2 polymer components which provide adhesion and improved durability as measured by improved gloss retention or dirt pick up resistance in dried coatings made from the coating composition are disclosed.

7 Claims, No Drawings

COATING COMPOSITIONS

Coating Compositions

This invention relates to aqueous coating compositions containing at least two polymeric components which provide adhesion and durability as measured by improved gloss retention or dirt pick up resistance in dried coatings made from the coating composition.

Pre-finished metal siding is metal sheet which has been coated with materials such as polyesters. Dried coatings do not typically adhere well to substrates such as polyolefins and pre-finished metal siding. Durability, as measured by improved gloss retention or dirt pick up resistance is a desired quality in dried coatings. Coating compositions with good adhesion to polyolefins and pre-finished metal siding do not normally have durability as measured by improved gloss retention or dirt pick up resistance. Coating compositions with durability as measured by improved gloss retention or dirt pick up resistance do not normally have good adhesion to polyolefins and pre-finished metal siding. There is an ongoing need for a coating composition which provides good adhesion to polyolefins and pre-finished metal siding, and has improved durability as measured by improved gloss retention or dirt pick up resistance.

Japanese Patent J 63-18632 discloses a water based coating composition having outstanding gloss and durability. The composition contains greater than 15% of a polymeric component A, which has a molecular weight greater than 255,000. The composition also contains greater than 15% of a polymeric component B, which has a molecular weight less than 52,000. The disclosure states that component A provides durability and component B provides gloss. The glass transition temperature ("Tg") of the 2 components, when calculated by the Fox equation, are substantially the same. The compositions were tested for gloss and durability on slate boards and glass plates.

Patent Cooperation Treaty Patent Application WO 94/04575 discloses an aqueous styrene/butadiene polymer dispersion having a broad molecular weight distribution with only 1 maximum. The dispersion is made by a polytelomerization process and has adhesive properties as demonstrated by adhesion tests on polyesters.

Despite the disclosure of the prior art, there is an ongoing need for a coating composition which provides good adhesion to polyolefins and pre-finished metal siding, and has durability as measured by improved gloss retention or dirt pick up resistance.

We have surprisingly found that a coating composition which provides good adhesion to polyolefins and pre-finished metal siding, and durability as measured by improved gloss retention or dirt pick up resistance can be prepared by making a two polymer composition and controlling the molecular weight and the Tg of each polymer.

The present invention provides a composition comprising:

an emulsion polymer prepared from at least one ethylenically unsaturated monomer, provided that the monomer is not an alkene or a diene, the emulsion polymer having:
from 40% to 90% by weight of a first polymer having a Tg of from 0° C. to 60° C.; and
from 10% to 60% by weight of a second polymer having a Tg of from 10° C. to 100° C., provided that the Tg of the second polymer is at least 10° C. higher than the Tg of the first polymer, and provided that the first polymer is higher in molecular weight than the second polymer, such that when both polymers are combined, from 5% to 40% by weight of the total polymer has a molecular weight greater than 255,000 and greater than 30% by weight of the total polymer has a molecular weight below 52,000.

In another embodiment, the present invention provides a composition comprising:

an emulsion polymer prepared from at least one ethylenically unsaturated monomer, provided that the monomer is not an alkene or a diene, the emulsion polymer having:
from 40% to 90% by weight of a first polymer having a Tg of from 0° C. to 60° C.;
from 10% to 60% by weight of a second polymer having a Tg of from 10° C. to 100° C., provided that the first polymer is higher in molecular weight than the second polymer, such that when both polymers are combined, from 5% to 40% by weight of the total polymer has a molecular weight greater than 255,000 and greater than 30% by weight of the total polymer has a molecular weight below 52,000; and
from 2% to 25% based on the total weight of monomers of the first polymer acetoacetoxy-functional monomer incorporated into the first polymer.

In another embodiment, the present invention provides a method of providing dried coatings with adhesion, gloss, durability, and dirt pick up resistance comprising:

providing a composition of this invention;

applying said composition to a substrate; and drying said composition.

In another embodiment, the present invention provides an article comprising:

a substrate selected from the group consisting of wood, polyolefins, pre-finished metal siding, concrete, and asphalt coated with a dried coating from a composition of this invention.

The compositions of this invention may be prepared by conventional emulsion polymerization techniques. The components may be prepared in separate batches and then combined, or may be made by a multi-stage process. Emulsion polymerization processes are known in the art and are disclosed, for example in U.S. Pat. No. 5,346,954. Multi-stage polymer processes are also known in the art and are disclosed, for example, in U.S. Pat. Nos. 4,325,856, 4,654,397, and 4,814,373.

The compositions may be applied to substrates such as, for example, wood, plastics such as polyolefins, pre-finished metal siding, bare metal, masonry, weathered or chalked paint surfaces, concrete, and asphalt, and dried, providing dried coatings with adhesion, gloss, durability, and dirt pick up resistance. Preferred substrates are polyolefins, pre-finished metal siding, and bare metal. The composition may be formulated into a coating composition prior to applying the composition to a substrate. The coating composition may contain emulsifiers, pigments and fillers, dispersants, coalescing agents, curing agents, thickeners, humectants, wetting agents, biocides, plasticizers, antifoaming agents, colorants, waxes, and antioxidants. The coating composition may be applied to the substrate and dried, leaving a dried coating which has adhesion and improved gloss, durability, or dirt pick up resistance on the substrate. The coating may be either air dried at ambient temperature, or force-dried at elevated temperature.

Suitable monomers for use in the preparation of the compositions of this invention include, but are not limited to acrylic ester monomers including methyl acrylate, ethyl acrylate, butyl acrylate, 2-ethylhexyl acrylate, decyl acrylate, methyl methacrylate, butyl methacrylate, hydroxyethyl methacrylate, and hydroxypropyl acrylate; acrylamide or substituted acrylamides; styrene or substituted styrene; vinyl acetate or other vinyl esters; vinyl monomers such as vinyl chloride, vinylidene chloride, N-vinyl pyrolidone; and acrylonitrile or methacrylonitrile. Low levels of copolymerized ethylenically unsaturated acid monomers such as, for example, 0.1%–7%, by weight based on the weight of the emulsion-polymerized polymer, acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride may also be used. Suitable monomers for use in the preparation of the compositions of this invention do not include alkenes or dienes. By alkenes or dienes is meant straight or branched chain hydrocarbon alkenes or dienes.

In one embodiment, an acetoacetoxy-functional monomer is incorporated in the first polymer at from 0.05% to 25% based on the weight of the polymer solids. Preferred is from 5% to 20% acetoacetoxy-functional monomer based on the weight of the polymer solids. More preferred is from 10% to 15% acetoacetoxy-functional monomer based on the weight of the polymer solids. The acetoacetoxy-functional monomer may also be incorporated into the second polymer of the composition. Suitable acetoacetoxy-functional monomers include, but are not limited to 2(acetoacetoxy) ethyl methacrylate ("AAEM"), acetoacetoxy ethyl acrylate, allyl acetoacetate, vinyl acetoacetate, and combinations thereof.

The addition of a crosslinking agent to the compositions of this invention may further improve the performance of the coating. Conventional crosslinking agents such as, for example, a polyaziridine, polyisocyanate, polycarbodiimide, polyepoxide, polyaminoplast, polyalkoxy silane, polyoxazolidine, polyamine and a polyvalent metal compound may be used, providing that the crosslinking agent does not inhibit film formation. Typically, from 0.05% to 25% of the crosslinking agent is used, based on the weight of the polymer solids. Preferred is from 0.1% to 20% crosslinking agent based on the weight of the polymer solids. More preferred is from 1% to 10% crosslinking agent based on the weight of the polymer solids.

Chain transfer agents may be used to control the molecular weight of the compositions of this invention. Suitable chain transfer agents for use in this invention are mercaptans, such as, for example, dodecylmercaptan and methyl mercaptopropionate. The chain transfer agent may be used at from 0.1% to 10% based on the total weight of the polymeric composition.

The compositions of this invention have bimodal molecular weight distributions as determined by Gel Permeation Chromatography ("GPC"). Molecular weights are defined as polystyrene-equivalent molecular weights. Polystyrene-equivalent molecular weights are based on the elution of the polymer at the same time as a polystyrene of a certain molecular weight. There is typically from 5% to 40% of the total polymer with a molecular weight greater than 255,000. Preferred is from 20% to 30% of the total polymer with a molecular weight greater than 255,000. More preferred is from 20% to 25% of the total polymer with a molecular weight greater than 255,000. There is typically greater than 30% of the total polymer with a molecular weight less than 52,000. Preferred is from 35% to 60% of the total polymer with a molecular weight less than 52,000. More preferred is from 45% to 60% of the total polymer with a molecular weight less than 52,000.

The Tg of the compositions of this invention may be determined by Differential Scanning Calorimetry ("DSC"). When the compositions are prepared by a batch process, the Tg of each polymer may be determined separately by DSC. When a multi-stage process is used to prepare the compositions, the Tg of the first polymer may be determined by DSC. The Tg of the total composition can then be measured, and the Tg of the second polymer back-calculated by correcting for the Tg of the first polymer. The calculated Tg of the samples of this invention are listed in Table 13. The Tg of the first polymer is typically from 0° C. to 60° C. Preferred is a Tg of from 10° C. to 35° C. More preferred is a Tg of from 15° C. to 30° C. The Tg of the second polymer is typically from 10° C. to 100° C. Preferred is a Tg of from 40° C. to 70° C. More preferred is a Tg of from 45° C. to 65° C.

The following abbreviations are used throughout this patent application: AA—acrylic acid, AAEM—2 (acetoacetoxy) ethyl methacrylate, STY—Styrene BA—butyl acrylate, BMA—butyl methacrylate, CTA—chain transfer agent, EDTA—ethylenendiamine tetraacetic acid, IBOMA—isobornyl methacrylate, MAA—methacrylic acid, MMA—methyl methacrylate, MMP—methyl mercaptopropionate, n-DDM—dodecylmercaptan, g—grams, DI water—deionized water, ° C.—degrees Centigrade, %—percent, #—number, ME—monomer emulsion The following examples are intended to demonstrate the compositions of this invention and their improved performance in coatings.

Example 1—Comparative

Sample 1

A 4-necked 5 liter round bottom flask, equipped with a condensor, stirrer and thermocouple was charged with 1047.1 g of DI water. The flask was heated to 88° C. under a nitrogen blanket. To the flask was added 154.9 g of a 41% solids, 60 nm BA/MMA/ MAA latex polymer preform with a 48.1 g DI water rinse, and a solution of 5.0 g sodium carbonate in 60 g DI water followed by the addition of a solution of 4.0 g of ammonium persulfate in 22.1 g DI water. One minute after the last addition to the flask, with the temperature at 81° C., the gradual addition of ME #1 and catalyst cofeed solution #1 were begun. Both feeds were fed over a 90 minute period. The containers for ME #1 and the catalyst cofeed solution #1 were rinsed with DI water into the reactor flask (19.2 g for the former and 9.6 g for the later). After 20 minutes, the gradual addition of ME #2 and catalyst cofeed solution #2 were begun and fed over a 90 minute period. After these additions were completed, the containers for ME #2 and the catalyst cofeed solution #2 were rinsed with DI water (50.1 g for the former and 9.6 g for the later). After 30 minutes, the reaction was cooled to 65° C., and 5.7 g of 0.15% ferrous sulfate heptahydrate solution mixed with 26.9 g of 1% EDTA solution was added followed by 2.6 g of 70% t-butyl hydroperoxide in 21.2 g of DI water and by 1.3 g of isoasorbic acid in 44.2 g of DI water. After 30 minutes, the reaction was cooled to 30° C. During cooling, 26.5 g of 28% ammonia hydroxide was added to bring the latex pH to 9.0. The weights of materials used to make this sample are in Table 1.

TABLE 1

| Catalyst Cofeed Solution #1 | |
|---|---|
| Ammonium persulfate | 1.0 g |
| DI water | 48.1 g |
| ME #1 | |
| DI water | 307.5 g |
| ammonium salt of branched nonylphenoxy polyethoxy sulfate (58%) | 12.9 g |
| BA | 400.0 g |
| MMA | 580.0 g |
| AA | 20.00 g |
| Catalyst Cofeed Solution #2 | |
| Ammonium persulfate | 1.0 g |
| DI water | 48.1 g |
| ME #2 | |
| DI water | 288.3 g |
| ammonium salt of branched nonylphenoxy polyethoxy sulfate (58%) | 12.9 g |
| n-DDM | 10.0 g |
| BA | 400.0 g |
| MMA | 580.0 g |
| AA | 20.0 g |

Example 2—Samples 2–5—The Effect Of Tg On Adhesion And Durability

Sample 2

Sample 2 was prepared following the same procedure as Sample 1. During cooling, 22 g of 28% ammonia hydroxide was added to bring the latex pH to 8.7. The weights of materials used to make this sample are in Table 2.

TABLE 2

| Catalyst Cofeed Solution #1 | |
|---|---|
| Ammonium persulfate | 1.0 g |
| DI water | 48.1 g |
| ME #1 | |
| DI water | 307.5 g |
| ammonium salt of branched nonylphenoxy polyethoxy sulfate (58%) | 12.9 g |
| BA | 400.0 g |
| MMA | 580.0 g |
| AA | 20.00 g |
| Catalyst Cofeed Solution #2 | |
| Ammonium persulfate | 1.0 g |
| DI water | 48.1 g |
| ME #2 | |
| DI water | 288.3 g |
| ammonium salt of branched nonylphenoxy polyethoxy sulfate (58%) | 12.9 g |
| n-DDM | 10.0 g |
| BA | 152.0 g |
| BMA | 200.0 g |
| MMA | 628.0 g |
| AA | 20.0 g |

Sample 3

Sample 3 was prepared following the same procedure as Sample 1. The 5 liter flask was initially charged with 1063.2 g of DI water. When the addition of ME #2 and catalyst cofeed solution #2 were begun, CTA cofeed #2 was also begun. All 3 solutions were fed over a 90 minute period. The containers were rinsed with 50.1 g, 9.6 g, and 9.6 g of DI water respectively. During cooling, 19.9 g of 28% ammonia hydroxide was added to bring the latex pH to 8.6. The weights of materials used to make this sample are in Table 3.

TABLE 3

| Catalyst Cofeed Solution #1 | |
|---|---|
| Ammonium persulfate | 1.0 g |
| DI water | 48.1 g |
| ME #1 | |
| DI water | 307.5 g |
| ammonium salt of branched nonylphenoxy polyethoxy sulfate (58%) | 12.9 g |
| BA | 400.0 g |
| MMA | 580.0 g |
| AA | 20.00 g |
| Catalyst Cofeed Solution #2 | |
| Ammonium persulfate | 1.0 g |
| DI water | 48.1 g |
| CTA Cofeed #2 | |
| MMP | 25.0 g |
| ME #2 | |
| DI water | 288.3 g |
| ammonium salt of branched nonylphenoxy polyethoxy sulfate (58%) | 12.9 g |
| BA | 71.0 g |
| BMA | 200.0 g |
| MMA | 709.0 g |
| AA | 20.0 g |

Sample 4

Sample 4 was prepared following the same procedure as Sample 1. The 5 liter flask was initially charged with 1079.1 g of DI water. The initial sodium carbonate charge was 3.5 g in 45 g DI water. ME #1 and catalyst cofeed solution #1 were fed over a 126 minute period. The containers for ME #1 and catalyst cofeed solution #1 were rinsed with 26.9 g and 9.6 g DI water respectively. When the addition of ME #2 and catalyst cofeed solution #2 were begun, CTA cofeed #2 was also begun. All 3 solutions were fed over a 54 minute period. The containers were rinsed with 32.7 g, 9.6 g, and 9.6 g of DI water respectively. During cooling, 10.9 g of 28% ammonia hydroxide was added to bring the latex pH to 8.7. The weights of materials used to make this sample are in Table 4.

TABLE 4

| Catalyst Cofeed Solution #1 | |
|---|---|
| Ammonium persulfate | 1.4 g |
| DI water | 67.3 g |
| ME #1 | |
| DI water | 415.2 g |
| ammonium salt of branched nonylphenoxy polyethoxy sulfate (58%) | 18.1 g |
| n-DDM | 4.2 g |
| BA | 375.2 g |
| BMA | 476.0 g |
| MMA | 415.8 g |
| STY | 98.0 g |
| MAA | 35.0 g |
| Catalyst Cofeed Solution #2 | |
| Ammonium persulfate | 0.6 g |
| DI water | 28.9 g |

TABLE 4-continued

| CTA Cofeed #2 | |
|---|---|
| MMP | 30.0 g |
| ME #2 | |
| DI water | 180.7 g |
| ammonium salt of branched nonylphenoxy polyethoxy sulfate (58%) | 7.8 g |
| BA | 73.8 g |
| BMA | 60.0 g |
| MMA | 286.2 g |
| IBOMA | 180.0 g |

Sample 5

Sample 5 was prepared following the same procedure as Sample 1. The 5 liter flask was initially charged with 1065.2 g of DI water. The initial sodium carbonate charge was 5 g in 60 g DI water. ME #1 and catalyst cofeed solution #1 were fed over a 126 minute period. The containers for ME #1 and catalyst cofeed solution #1 were rinsed with 26.9 g and 9.6 g DI water respectively. When the addition of ME #2 and catalyst cofeed solution #2 were begun, CTA cofeed #2 was also begun. All 3 solutions were fed over a 54 minute period. The containers were rinsed with 32.7 g, 9.6 g, and 9.6 g of DI water respectively. During cooling, 14.8 g of 28% ammonia hydroxide was added to bring the latex pH to 8.7. The weights of materials used to make this sample are in Table 5.

TABLE 5

| Catalyst Cofeed Solution #1 | |
|---|---|
| Ammonium persulfate | 1.4 g |
| DI water | 67.3 g |
| ME #1 | |
| DI water | 415.2 g |
| ammonium salt of branched nonylphenoxy polyethoxy sulfate (58%) | 18.1 g |
| n-DDM | 4.2 g |
| BA | 375.2 g |
| BMA | 476.0 g |
| MMA | 415.8 g |
| STY | 98.0 g |
| MAA | 35.0 g |
| Catalyst Cofeed Solution #2 | |
| Ammonium persulfate | 0.6 g |
| DI water | 28.9 g |
| CTA Cofeed #2 | |
| MMP | 30.0 g |
| ME #2 | |
| DI water | 180.7 g |
| ammonium salt of branched nonylphenoxy polyethoxy sulfate (58%) | 7.8 g |
| BA | 82.2 g |
| BMA | 60.0 g |
| MMA | 262.8 g |
| IBOMA | 180.0 g |
| MAA | 15.0 g |

Example 3—Samples 6–10—The Effect Of Crosslinking Agents

Sample 6

Sample 6 was prepared following the same procedure as Sample 1. The 5 liter flask was initially charged with 1083.9 g of DI water. The initial sodium carbonate charge was 2.8 g in 37.5 g DI water. ME #1 was fed over 99 minutes. The containers for ME #1 and catalyst cofeed solution #1 were rinsed with 21.1 g and 9.6 g DI water respectively. When the addition of ME #2 and catalyst cofeed solution #2 were begun, CTA cofeed #2 was also begun. All 3 solutions were fed over a 81 minute period. The containers were rinsed with 38.5 g, 9.6 g, and 9.6 g of DI water respectively. During cooling, 40 g of 28% ammonia hydroxide was added to bring the latex pH to 8.7. The weights of materials used to make this sample are in Table 6.

TABLE 6

| Catalyst Cofeed Solution #1 | |
|---|---|
| Ammonium persulfate | 1.1 g |
| DI water | 52.9 g |
| ME #1 | |
| DI water | 334.4 g |
| ammonium salt of branched nonylphenoxy polyethoxy sulfate (58%) | 14.2 g |
| n-DDM | 3.3 g |
| BA | 297.0 g |
| BMA | 258.5 g |
| MMA | 275.0 g |
| STY | 77.0 g |
| AAEM | 165.0 g |
| MAA | 27.5 g |
| Catalyst Cofeed Solution #2 | |
| Ammonium persulfate | 0.9 g |
| DI water | 43.3 g |
| CTA Cofeed #2 | |
| MMP | 22.5 g |
| ME #2 | |
| DI water | 261.4 g |
| ammonium salt of branched nonylphenoxy polyethoxy sulfate (58%) | 11.6 g |
| BA | 81.9 g |
| BMA | 180.0 g |
| MMA | 638.1 g |

Sample 7

Sample 7 was prepared following the same procedure as Sample 1. The 5 liter flask was initially charged with 1080.9 g of DI water. The initial sodium carbonate charge was 3.5 g in 45 g DI water. ME #1 and catalyst cofeed solution #1 were fed over a 126 minute period. The containers for ME #1 and catalyst cofeed solution #1 were rinsed with 26.9 g and 9.6 g DI water respectively. When the addition of ME #2 and catalyst cofeed solution #2 were begun, CTA cofeed #2 was also begun. All 3 solutions were fed over a 54 minute period. The containers were rinsed with 32.7 g, 9.6 g, and 9.6 g of DI water respectively. During cooling, 48.8 g of 28% ammonia hydroxide was added to bring the latex pH to 8.6. The weights of materials used to make this sample are in Table 7.

TABLE 7

| Catalyst Cofeed Solution #1 | |
|---|---|
| Ammonium persulfate | 1.4 g |
| DI water | 67.3 g |
| ME #1 | |
| DI water | 415.2 g |
| ammonium salt of branched nonylphenoxy polyethoxy | 18.1 g |

TABLE 7-continued

| | |
|---|---|
| sulfate (58%) | |
| n-DDM | 4.2 g |
| BA | 378.0 g |
| BMA | 329.0 g |
| MMA | 350.0 g |
| STY | 98.0 g |
| AAEM | 210.0 g |
| MAA | 35.0 g |
| Catalyst Cofeed Solution #2 | |
| Ammonium persulfate | 0.6 g |
| DI water | 28.9 g |
| CTA Cofeed #2 | |
| MMP | 30.0 g |
| ME #2 | |
| DI water | 180.7 g |
| ammonium salt of branched nonylphenoxy polyethoxy sulfate (58%) | 7.8 g |
| BA | 73.8 g |
| BMA | 60.0 g |
| MMA | 286.2 g |
| IBOMA | 180.0 g |

Sample 8

Sample 8 was prepared following the same procedure as Sample 1. The 5 liter flask was initially charged with 1077.6 g of DI water. The initial sodium carbonate charge was 3.5 g in 45 g DI water. ME #1 and catalyst cofeed solution #1 were fed over a 126 minute period. The containers for ME #1 and catalyst cofeed solution #1 were rinsed with 26.9 g and 9.6 g DI water respectively. When the addition of ME #2 and catalyst cofeed solution #2 were begun, CTA cofeed #2 was also begun. All 3 solutions were fed over a 54 minute period. The containers were rinsed with 32.7 g, 9.6 g, and 9.6 g of DI water respectively. During cooling, 50 g of 28% ammonia hydroxide was added to bring the latex pH to 8.6. The weights of materials used to make this sample are in Table 8.

TABLE 8

| | |
|---|---|
| Catalyst Cofeed Solution #1 | |
| Ammonium persulfate | 1.4 g |
| DI water | 67.3 g |
| ME #1 | |
| DI water | 415.2 g |
| ammonium salt of branched nonylphenoxy polyethoxy sulfate (58%) | 18.1 g |
| n-DDM | 4.2 g |
| BA | 486.2 g |
| BMA | 420.0 g |
| MMA | 150.8 g |
| STY | 98.0 g |
| AAEM | 210.0 g |
| MAA | 35.0 g |
| Catalyst Cofeed Solution #2 | |
| Ammonium persulfate | 0.6 g |
| DI water | 28.9 g |
| CTA Cofeed #2 | |
| MMP | 30.0 g |
| ME #2 | |
| DI water | 180.7 g |
| ammonium salt of branched nonylphenoxy polyethoxy sulfate (58%) | 7.8 g |
| BMA | 74.8 g |
| MMA | 255.2 g |
| IBOMA | 270.0 g |

Sample 9

Sample 9 was prepared following the same procedure as Sample 1. The 5 liter flask was initially charged with 1090.9 g of DI water. The initial sodium carbonate charge was 3.5 g in 45 g DI water. ME #1 and catalyst cofeed solution #1 were fed over a 126 minute period. The containers for ME #1 and catalyst cofeed solution #1 were rinsed with 26.9 g and 9.6 g DI water respectively. When the addition of ME #2 and catalyst cofeed solution #2 were begun, CTA cofeed #2 was also begun. All 3 solutions were fed over a 54 minute period. The containers were rinsed with 32.7 g, 9.6 g, and 9.6 g of DI water respectively. During cooling, 50 g of 28% ammonia hydroxide was added to bring the latex pH to 8.6. The weights of materials used to make this sample are in Table 9.

TABLE 9

| | |
|---|---|
| Catalyst Cofeed Solution #1 | |
| Ammonium persulfate | 1.4 g |
| DI water | 67.3 g |
| ME #1 | |
| DI water | 415.2 g |
| ammonium salt of branched nonylphenoxy polyethoxy sulfate (58%) | 18.1 g |
| n-DDM | 14.0 g |
| BA | 378.0 g |
| BMA | 329.0 g |
| MMA | 350.0 g |
| STY | 98.0 g |
| AAEM | 210.0 g |
| MAA | 35.0 g |
| Catalyst Cofeed Solution #2 | |
| Ammonium persulfate | 0.6 g |
| DI water | 28.9 g |
| CTA Cofeed #2 | |
| MMP | 30.0 g |
| ME #2 | |
| DI water | 180.7 g |
| ammonium salt of branched nonylphenoxy polyethoxy sulfate (58%) | 7.8 g |
| BA | 73.8 g |
| BMA | 60.0 g |
| MMA | 286.2 g |
| IBOMA | 180.0 g |

Sample 10

Sample 10 was prepared following the same procedure as Sample 1. The 5 liter flask was initially charged with 1078.4 g of DI water. The initial sodium carbonate charge was 4 g in 50 g DI water. ME #1 and catalyst cofeed solution #1 were fed over a 144 minute period. The containers for ME #1 and catalyst cofeed solution #1 were rinsed with 30.8 g and 9.6 g DI water respectively. When the addition of ME #2 and catalyst cofeed solution #2 were begun, CTA cofeed #2 was also begun. All 3 solutions were fed over a 36 minute period. The containers were rinsed with 28.9 g, 9.6 g, and 9.6 g of DI water respectively. During cooling, 60 g of 28% ammo nia hydroxide was added to bring the latex pH to 8.7. The weights of materials used to make this sample are in Table 10.

TABLE 10

| Catalyst Cofeed Solution #1 | |
|---|---|
| Ammonium persulfate | 1.6 g |
| DI water | 77.0 g |
| ME #1 | |
| DI water | 469.0 g |
| ammonium salt of branched nonylphenoxy polyethoxy sulfate (58%) | 20.7 g |
| n-DDM | 4.8 g |
| BA | 432.0 g |
| BMA | 376.0 g |
| MMA | 400.0 g |
| STY | 112.0 g |
| AAEM | 240.0 g |
| MAA | 40.0 g |
| Catalyst Cofeed Solution #2 | |
| Ammonium persulfate | 0.4 g |
| DI water | 19.2 g |
| CTA Cofeed #2 | |
| MMP | 30.0 g |
| ME #2 | |
| DI water | 126.8 g |
| ammonium salt of branched nonylphenoxy polyethoxy sulfate (58%) | 5.2 g |
| BA | 9.6 g |
| BMA | 40.0 g |
| MMA | 230.4 g |
| IBOMA | 120.0 g |

Example 4—Sample 11—The Effect Of Reversing The Order Of Preparation

Sample 11

Sample 11 was prepared following the same procedure as Sample 1. The 5 liter flask was initially charged with 1069.3 g of DI water. The initial sodium carbonate charge was 0.3 g in 20 g DI water. While ME #1 and catalyst cofeed solution #1 were being fed, CTA cofeed #1 was also being fed. All 3 solutions were fed over a 54 minute period. The containers for ME #1, catalyst cofeed solution #1, and CTA cofeed #1 were rinsed with 11.5 g, 9.6 g, and 9.6 g DI water respectively. There was no CTA cofeed #2 in this sample. ME #2 and catalyst cofeed #2 were fed over a 126 minute period. The containers were rinsed with 48.1 g, and 9.6 g of DI water respectively. During cooling, 7.6 g of 28% ammonia hydroxide was added to bring the latex pH to 8.4. The weights of materials used to make this sample are in Table 11.

TABLE 11

| Catalyst Cofeed Solution #1 | |
|---|---|
| Ammonium persulfate | 2.0 g |
| DI water | 22.1 g |
| CTA Cofeed #1 | |
| MMP | 30.0 g |
| ME #1 | |
| DI water | 199.9 g |
| ammonium salt of branched nonylphenoxy polyethoxy sulfate (58%) | 7.8 g |
| BA | 73.8 g |
| BMA | 60.0 g |
| MMA | 283.2 g |
| IBOMA | 180.0 g |
| MAA | 3.0 g |
| Catalyst Cofeed Solution #2 | |
| Ammonium persulfate | 2.4 g |
| DI water | 67.3 g |
| ME #2 | |
| DI water | 431.0 g |
| ammonium salt of branched nonylphenoxy polyethoxy sulfate (58%) | 18.1 g |
| n-DDM | 4.2 g |
| Sodium carbonate | 3.5 g |
| BA | 375.2 g |
| BMA | 476.0 g |
| MMA | 415.8 g |
| STY | 98.0 g |
| MAA | 35.0 g |

Molecular Weight Analysis

Samples were analyzed by GPC. The chromatographic system was composed of a Waters Associates Model 510 pump, a Valco 6-port valve equipped with a 100 um sample loop, the chromatographic columns, and a Waters Model 410 differential refractive index detector. The columns used were a pair of Polymer Labs Mixed-A 30 cm×7.8 mm columns.

For analysis, the sample was dissolved in THF, at approximately 0.25% by weight. Samples were diluted with THF, shaken, filtered, and loaded into the sample loop with an automated system based on a Zymark robot.

The system was calibrated with known polystyrene standards, thus molecular weights are in polystyrene-equivalent weights. The results of the analysis are in Table 12.

TABLE 12

| Sample | MW (×1,000) | Sample | MW (×1,000) |
|---|---|---|---|
| 1* | 49% > 255, 25% < 52 | 7 | 25% > 255, 51% < 52 |
| 2* | 47% > 255, 26% < 52 | 8 | 24% > 255, 53% < 52 |
| 3 | 39% > 255, 48% < 52 | 9 | 6% > 255, 71% < 52 |
| 4 | 18% > 255, 55% < 52 | 10 | 25% > 255, 47% < 52 |
| 5 | 17% > 255, 56% < 52 | 11 | 19% > 255, 51% < 52 |
| 6 | 21% > 255, 59% < 52 | | |

TABLE 13

| Sample | Tg (° C.) | Sample | Tg (° C.) |
|---|---|---|---|
| 1* | 32.1/28.8 | 7 | 29.1/45 |
| 2* | 32.1/48 | 8 | 15/65 |
| 3 | 32.1/48 | 9 | 29.1/45 |
| 4 | 29.1/45 | 10 | 29.1/45 |
| 5 | 29.1/45 | 11 | 29.1/45 |
| 6 | 29.1/45 | | |

*= Comparative Sample
Tg = Tg Polymer 1/Tg Polymer 2 (Calculated)

Coating Compositions were prepared as follows:

Preparation of Pigmented Coatings

Pigmented coatings were formulated according to Table 14.

TABLE 14

The following were ground for 15 minutes on a Cowles Dissolver:

| | | |
|---|---|---|
| Water | | 23.44 g |
| Tamol ®681M | dispersant | 3.46 g |
| Aqueous ammonia (28%) | neutralizer | 0.4 g |
| Triton ®CF-10 | surfactant | 0.75 g |
| Drew ®L-493 | defoamer | 0.34 g |
| Tiona ®RCL-628 | TiO2 pigment | 81.9 g | the following letdown materials were added with stirring:

| | | |
|---|---|---|
| Latex | binder | 293.3 g |
| Water | | 63.8 g |
| Aqueous ammonia (14%) | neutralizer | 1.18 g |
| Sodium nitrite (15%) | flash rust inhibitor | 4.5 g |
| Texanol ® | coalescent | 17.9 g |
| Acrysol ®QR-708 (10%) | thickener | 5.0 g |

Preparation of Clear Coatings

Clear coatings were formulated according to Table 15.

TABLE 15

| | |
|---|---|
| Latex | 150 g |
| Deionized water | 36 g |
| Dowanol ®PnB (coalescent) | 14.4 g |
| Dibutylphthalate (plasticizer) | 2.2 g |
| 10% Acrysol ®QR-708 (thickener) | 1.0 g |

The following tests were performed on the compositions of this invention:

Gloss and Gloss Retention

Pigmented coatings were applied to Bonderite 1000 steel panels using a drawdown bar with a 10 mil gap. After drying for 2 weeks at room temperature, gloss of the dried films was measured using a Byk Labotron Gloss Unit. Twenty degrees (20°) and 60° gloss values are reported.

The dried coatings were placed in a QTV cabinet (Q-Panel Company, Cleveland, Ohio) and exposed for 333 hours. "A" bulbs (340 nm) were used. Values were reported in percent retention of initial 20° gloss. Gloss retention values of greater than 15% are considered acceptable.

Dirt Pickup Resistance

Pigmented coatings were applied to aluminum "Q" panels using a drawdown bar with a 10 mil gap. The samples were dried for 2 weeks at 25° C./50% relative humidity. Initial Y-reflectance was measured using a Pacific Scientific Colorguard 45/0 Reflectometer (Gardner/Neotec Instrument Division, Silver Springs, Md.). The panels were then placed in a fogbox for 1.5 hours. The panels were removed and blotted dry. A uniform aqueous mixture was produced by dispersing 125 grams of Mapico 422 iron oxide (Columbian Chemicals Company, Tulsa, Okla.) and two drops of Tamol®731 anionic copolymer dispersing resin (Rohm and Haas Company, Philadelphia, Pa.) in 250 grams of water. The mixture was dispersed using a Lightnin' mixer (Mixing Equipment Company, Inc., Rochester, N.Y.) and brush applied onto the panel a surfaces.

The slurry-coated panels were air dried for 3 hours. The panels were then placed in a 65° C. oven for one hour, removed and allowed to cool for 30 minutes. Each panel was washed under tepid water while rubbing lightly and evenly with a cheesecloth pad. The panels were then air dried for a minimum of 4 hours. Y-reflectance values were again taken over the stained area, and reported. The larger the absolute value of Y-reflectance, the poorer the dirt pickup resistance. The severity of dirt pickup was also rated visually, and given a qualitative rating. Absolute values of Y-reflectance greater than −30, and qualitative ratings of "heavy" indicate unacceptable performance.

Crosshatch Adhesion Testing

Crosshatch adhesion was tested using ASTM D 3359-90, method B. A 100 square lattice pattern was made using a knife and cutting guide. Permacel 99 tape (Permacel Corp., New Brunswick, N.J.) was applied to the lattice using a rubber pencil eraser. After removal of the tape, the number of squares of coating remaining on the panel were counted. Higher values (100 is best) indicate better adhesion. Values greater than 30 represent acceptable adhesion.

Adhesion to Prefinished Siding

Galvanized steel panels factory-coated with Kynar, polyester/melamine, or silicone-modified polyester/melamine were obtained from MBCI, Lithia Springs, Ga. The panels were lightly wiped with a damp cloth to remove dust. Pigmented coatings were applied using a drawdown bar with a 10 mil gap, and air dried for 2 weeks at room temperature. Adhesion was tested by the crosshatch method.

Adhesion to Polypropylene

Polypropylene panels (Himont PP SB 823 BLK, Standard Plaque Inc., Melvindale, Mich.) were lightly wiped with a cloth moistened with a 50/50 mixture of isopropanol/VMP naphtha. Clear coatings were applied using a drawdown bar with a 7 mil gap, and dried for 30 minutes. The test panels were placed in an oven at 180° F. for 30 minutes, and allowed to cool at room temperature overnight. Adhesion was tested by the crosshatch method.

Adhesion to Vinyl Fascia Board

Pigmented coatings were brush applied to vinyl fascia board (Stoll Corp., Sydney, Ohio) and allowed to dry for 1 week at room temperature. Adhesion was tested by the crosshatch method.

The results of all tests are listed in Tables 16 and 17.

TABLE 16

| | White Paint Gloss | | Adhesion (cross hatch) | | | Clears | |
|---|---|---|---|---|---|---|---|
| Sample | Panel 1 | Panel 2 | Kynar | p-e 1 | p-e 2 | VFB | p-prop. |
| 1* | 51/80 | 54/79 | 0 | 0 | 8 | 0 | 0 |
| 2* | 50/78 | 51/69 | 0 | 0 | 9 | 0 | 0 |
| 3 | 53/80 | 54/79 | 8 | 10 | 43 | 80 | 0 |
| 4 | 65/84 | 64/84 | 33 | 100 | 100 | 95 | 80 |
| 5 | 65/84 | 66/84 | 33 | 98 | 99 | 100 | NA |
| 6 | 59/84 | 58/84 | 41 | 100 | 100 | 95 | NA |
| 7 | 53/81 | 54/81 | 15 | 96 | 100 | 75 | 75 |
| 8 | 57/81 | 57/83 | 71 | 100 | 100 | 95 | 100 |
| 9 | 76/88 | 78/88 | 41 | 100 | 100 | 100 | 100 |
| 10 | 55/81 | 55/82 | 47 | 100 | 100 | 95 | NA |

TABLE 16-continued

| | White Paint Gloss | | Adhesion (cross hatch) | | | | Clears |
|---|---|---|---|---|---|---|---|
| Sample | Panel 1 | Panel 2 | Kynar | p-e 1 | p-e 2 | VFB | p-prop. |
| 11 | 76/89 | 77/89 | 86 | 100 | 100 | 95 | NA | p-e 1 = polyester, p-e 2 = baked polyester, VFB = vinyl fascia board, p-prop. = polypropylene, NA = not analyzed, * = Comparative Sample, Clears = Clear Coatings

TABLE 17

| | Dirt Pick Up On Untreated Aluminum | | Gloss Retention | |
|---|---|---|---|---|
| Sample | y-reflect. | visual | initial | 333 hour |
| 1* | −40 | heavy | 54/79 | 13% |
| 2* | −16 | moderate | 51/79 | 22% |
| 3 | −15 | moderate | 54/79 | 19% |
| 4 | −47 | heavy | 64/84 | 5% |
| 5 | −44 | heavy | 66/84 | 5% |
| 6 | −6 | sl/mod | 55/82 | 75% |
| 7 | −13 | moderate | 54/81 | 78% |
| 8 | −12 | moderate | 57/83 | 82% |
| 9 | −22 | mod/hvy | 78/88 | 4% |
| 10 | −9 | moderate | 55/82 | 75% |
| 11 | −47 | heavy | 77/89 | 4% | y-reflect. = y-reflectance, 333 hour = after 333 hours in QUV "A", sl/mod = slight to moderate, mod/hvy = moderate to heavy, * = Comparative Sample The results show that compositions which provide good adhesion to polyolefins and pre-finished metal siding and have improved durability as measured by improved gloss retention or dirt pick up resistance can be prepared by making a two polymeric composition and controlling the molecular weight and the Tg of each polymer. The data indicate that durability and dirt pick up resistance are improved by increasing the Tg of the low molecular weight polymer. Adhesion and gloss are improved by controlling the molecular weight of the polymeric composition. The addition of a crosslinking agent improved the overall performance of the coating compositions.

What is claimed:

1. A composition comprising:
   an emulsion polymer prepared from at least one ethylenically unsaturated monomer selected from the group consisting of butyl acrylate, methyl methacrylate, acrylic acid, butyl methacrylate, styrene, isobornyl methacrylate, and methacrylic acid, provided that the monomer is not an alkene or a diene, the emulsion polymer having:
   from 40% to 90% by weight of a first polymer having a Tg of from 0° C. to 60° C.; and
   from 10% to 60% by weight of a second polymer having a Tg of from 10° C. to 100° C., provided that the Tg of the second polymer is at least 10° C. higher than the Tg of the first polymer, and provided that the first polymer is higher in molecular weight than the second polymer, such that when both polymers are combined, from 5% to 40% by weight of the total polymer has a molecular weight greater than 255,000 and greater than 30% by weight of the total polymer has a molecular weight below 52,000.

2. A method of providing dried coatings with adhesion, gloss, durability, and dirt pick up resistance comprising:
   providing a composition of claim 1;
   applying said composition to a substrate; and
   drying said composition.

3. An article comprising:
   a substrate selected from the group consisting of wood, polyolefins, pre-finished metal siding, concrete, and asphalt coated with a dried coating from the composition of claim 1.

4. A composition comprising:
   an emulsion polymer prepared from at least one ethylenically unsaturated monomer, provided that the monomer is not an alkene or a diene, the emulsion polymer having:
   from 40% to 90% by weight of a first polymer having a Tg of from 0° C. to 60° C.;
   from 10% to 60% by weight of a second polymer having a Tg of from 10° C. to 100° C., provided that the first polymer is higher in molecular weight than the second polymer, such that when both polymers are combined, from 5% to 40% by weight of the total polymer has a molecular weight greater than 255,000 and greater than 30% by weight of the total polymer has a molecular weight below 52,000; and
   from 2% to 25% based on the total weight of monomers of the first polymer acetoacetoxy-functional monomer incorporated into the first polymer.

5. A composition according to claim 4 wherein the monomer is selected from the group consisting of butyl acrylate, methyl methacrylate, acrylic acid, butyl methacrylate, styrene, isobornyl methacrylate, and methacrylic acid;
   the Tg of the first polymer is from 10° C. to 35° C.;
   the Tg of the second polymer is from 40° C. to 70° C.;
   from 20% to 30% of the total polymer has a molecular weight greater than 255,000;
   from 35% to 60% of the total polymer has a molecular weight less than 55,000; and
   the amount of acetoacetoxy-functional monomer is from 5% to 20%.

6. A method of providing dried coatings with adhesion, gloss, durability, and dirt pick up resistance comprising:
   providing a composition of claim 4;
   applying said composition to a substrate; and
   drying said composition.

7. An article comprising:
   a substrate selected from the group consisting of wood, polyolefins, pre-finished metal siding, concrete, and asphalt coated with a dried coating from the composition of claim 4.

* * * * *